United States Patent [19]
Beard et al.

[11] 3,744,879
[45] July 10, 1973

[54] LIQUID CRYSTAL OPTICAL PROCESSOR

[75] Inventors: Terry D. Beard, Woodland Hills; William P. Bleha, Jr., Santa Monica, both of Calif.

[73] Assignee: Hughes Aircraft Company, Culver City, Calif.

[22] Filed: Oct. 26, 1971

[21] Appl. No.: 192,406

[52] U.S. Cl........ 350/162 SF, 350/3.5, 350/160 LC
[51] Int. Cl.......................... G02b 27/38, G06q 9/00
[58] Field of Search ....................... 350/3.5, 162 SF, 350/160 LC

[56] References Cited
UNITED STATES PATENTS

| | | | |
|---|---|---|---|
| 2,892,380 | 6/1959 | Baumann et al............ | 350/160 LC |
| 3,592,527 | 7/1971 | Conners........................ | 350/160 LC |
| 3,085,469 | 4/1963 | Carlson........................ | 350/162 SF |

OTHER PUBLICATIONS

Myers et al., IBM Technical Disclosure Bulletin, Vol. 11, No. 10, March 1969, pp. 1314–1316.

MacAnally, Applied Physics Letters, Vol. 18, No. 2, Jan. 1971, pp. 54–56.

Margerum et al., Applied Physics Letters, Vol. 17, No. 2, July 1970, pp. 51–53.

*Primary Examiner*—David Schonberg
*Assistant Examiner*—Ronald J. Stern
*Attorney*—W. H. MacAllister, Jr. and Allen A. Dicke, Jr.

[57] ABSTRACT

The optical processor employs a photoconductor-activated liquid crystal as a spatial filter to control transmissivity of coherent light through the processor. The liquid crystal filter pattern determines the pattern input to Fourier transform and can optionally also define the transmissivity of a Fourier processing filter. This permits near real time transform.

16 Claims, 3 Drawing Figures

3,744,879

LIQUID CRYSTAL OPTICAL PROCESSOR

BACKGROUND

This invention is directed to an optical processor in the form of an optical computer which incorporates a photoconductor-activated liquid crystal to control optical transmissivity.

The prior art includes knowledge that, through optical data processing, mathematical techniques can be employed in a manner similar to those employed in electronic computations. It has been recognized that the two-dimensional capability of optical systems is such that two-dimensional signals such as pictures can be processed as a whole, without the necessary scanning, as in electronic systems. Holographic techniques add a third dimension to the data capable of being processed. The ultimate potential of optical computing or data processing systems has not been reached. Working systems have been developed for the processing of information in the specialized area of seismography, radio-astronomy, and radar. Furthermore, optical systems have the potential capability of processing communication signals and other complex data signals.

Further background on the utility and some of the techniques of optical processing are found in the book *Optical Data Processing*, by Arnold Roy Shulman, Wiley, N.Y., 1970. Another publication in this field is *Fourier Optics*, by Joseph Goodman, Stanford University Press. The entire disclosures of these publications are incorporated herein by this reference.

The data inserted in prior optical processes was in the form of photographic film. In preparation of this data, processing was very slow and inconvenient. Other methods considered for the introduction of input data have suffered from irreversibility, like photographic film, or suffer from insensitivity, or inefficiency with coherent light. Thus, prior structures for the introduction of data as input to an optical processor have been unsatisfactory.

SUMMARY

In order to aid in the understanding of this invention, it can be stated in essentially summary form that it is directed to a liquid crystal optical processor. The optical processor includes an optical axis, along which the coherent light travels. Optical devices are positioned along the axis to serve as input and output devices with respect to the information contained in the light. One of the input devices comprises a photoconductor-activated dynamic scattering mode liquid crystal, for convenience in providing input information into the collimated beam.

Accordingly, it is an object of this invention to provide a liquid crystal optical processor which permits the introduction of information into the optical processor on a near real time basis. It is another object to provide an optical processor which incorporates a coherent light path along an optical axis, with a dynamic scattering mode liquid crystal on the path for the control of the collimated light. It is a further object to provide a photoconductor-activated dynamic scattering mode liquid crystal device upon the coherent light path of an optical processor for efficiency in actuation. It is a further object to provide a liquid crystal optical processor which has a liquid crystal at both the input plane and at a location adjacent the focal point at the Fourier transform plane so that both the input data controlling the collimated light to the Fourier transform and the Fourier processing filter are liquid crystal devices.

Other objects and advantages of this invention will become apparent from a study of the following portion of the specification, the claims, and the attached drawings.

DESCRIPTION

Figure 2:
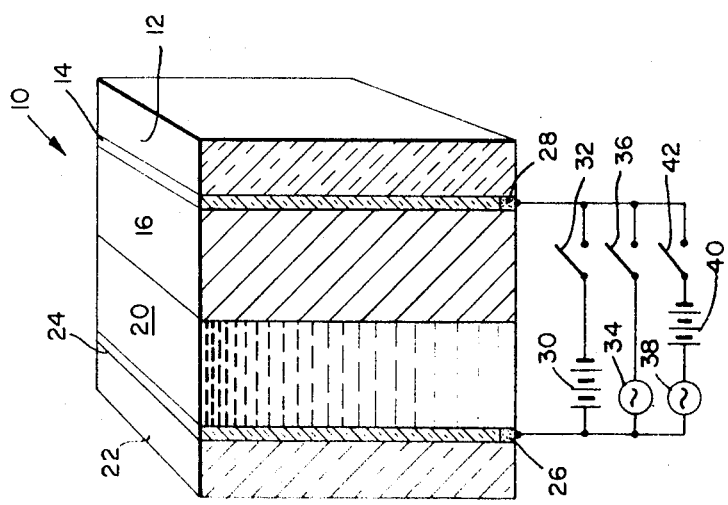
FIG. 2 is a schematic diagram of a liquid crystal as used in the optical processor.

FIG. 2 illustrates a liquid crystal cell 10 which is a photoconductor-activated dynamic scattering mode liquid crystal cell arrangement. The cell is a laminar structure. Glass substrate 12 is clear glass and is intended to be used for transmitting light therethrough. Therefore, it is preferably clear and flat with its outer surfaces substantially parallel. Quartz can also be employed as the structure. Transparent, electrically-conductive coating 14 is applied to one side of the glass. One type of coating which is useful is commercialy known as Nesa glass. This coating is specifically antimony-doped tin oxide or tin-doped indium oxide. Instead of employing Nesa glass, another convenient substantially transparent and electrically conductive coating is taught by Alfred F. Kaspaul U.S. Pat. No. 3,698,946. A layer constructed in accordance therewith can alternatively be employed. Another manner of forming the electrode layer 14 can be by sputtering tin oxide or indium oxide onto the glass substrate 12. Furthermore, thin metal layers, such as gold, can be employed for this purpose. The thickness of the transparent electrically conductive coating should be such as to give a resistance in the range of from 10 to 1,000 ohms per square.

Photoconductor film 16 is deposited onto the coating 14 by conventional vacuum deposition techniques. The photoconductors which are presently considered to be most desirable are zinc sulfide and cadmium sulfide. They can alternatively be used, or a layer of each is also useful. Thickness of the photoconductor film is from 0.5 to 12 microns.

On top of the photoconductive layer 16 is deposited a liquid crystal layer 20. The cell is completed by glass 22 on which is coated transparent conductive layer 24. The glass and its coating structurally correspond to glass 12 and its transparent conductive layer 14 described above. The two glass layers 12 and 22 thus define the outer surfaces of cell 10.

Liquid crystals are known and there are publications directed to their structure and utility. There are three principal types of liquid crystals of interest: nematic, cholesteric, and smectic. Several types of electrical field-activated phenomena have been reported in nematic liquid crystals, or in nematic-cholesteric mixtures. A reversible light scattering has been called dynamic scattering mode, and another mode is a phase mode in which the phase of the light passing through the liquid crystal film is modulated. The phase modulation capabilities of liquid crystal photoactivated light valves have also been used in this optical computer. The principle of operation is that, when light falls on the photoconductor film, its resistance is changed and thus the voltage appearing across the liquid crystal in contact with it is changed. The index of refraction of the liquid crystal depends on the voltage across it. Thus, the index of the film is modulated by the light falling on the photoconductor. Coherent light passing through this film has its phase modulated by this index difference in the liquid crystal film. Thus, the film acts as a photoactivated phase-modulating light valve and, as such, can be used as an optical processing input light valve.

There are two modes of liquid crystal activity employed in the optical processor, in accordance with this invention. When a nematic liquid crystal is sandwiched between two electrodes, such as electrodes 14 and 24, with proper spacing for liquid crystal thickness (the preferred liquid crystal film thickness is from 3 microns to 25 microns), an electric field will affect the physical properties. The dynamic scattering mode is enhanced by employment of the photoconductive layer 16. In the cell 10, when a voltage is applied to the electrodes, the high resistivity of the photoconductive layer, in the dark condition, prevents current from passing through the liquid crystal. However, when a spot on the photoconductive layer is optically activated, its resistance is decreased and the voltage becomes applied to the liquid crystal and produces an image in this area.

The photoconductor ZnS is ultraviolet-sensitive and is not sensitive to visible light. The photoconductor CdS is sensitive in the blue and green spectral regions and is not sensitive for wavelengths greater than 520 nm. Thus, an image can be recorded or written on the liquid crystal cell 10 made with the photoconductor ZnS with ultraviolet light and viewed or displayed with visible light. With the photoconductor CdS, an image can be recorded or written on the liquid crystal cell 10 with blue-green light and viewed or displayed with light with wavelengths greater than 520 nanometers. An exposure of only 0.1 millijoule cm$^{-2}$ can produce a dynamic scattering mode image 50 milliseconds after exposure.

With the ultraviolet sensitivity of the ZnS photoconductive layer, illumination thereof with ultraviolet light, in the range of 300 to 400 nanometers wavelength results in address of the liquid crystal. At the same time, illumination of the cell for projection by transmission-type projection display in the visible wavelengths results in projecting the information that is on the liquid crystal device. When a helium-neon laser is used as the projection illuminator as a source of collimated light, its wavelength is 632.8 nanometers, at which wavelength the liquid crystal is insensitive to address and exposure.

With the blue-green sensitivity of the CdS photoconductive layer, illumination thereof with blue-green light, in the range of 400 to 520 nanometers wavelength results in an address of the liquid crystal. At the same time, illumination of the cell for projection by transmission-type projection display for wavelengths greater than 520 nanometers results in projecting the information that is on the liquid crystal device. When a helium-neon laser is used as the projection illuminator as a source of collimated light, its wavelength is 632.8 nanometers, at which wavelength the liquid crystal cell is insensitive to address and exposure.

It should be noted that other photoconductors than ZnS and CdS could be used for this device. The following table gives further examples of several other photoconductors and their sensitivity wavelength range and projection light wavelength range:

|  | Sensitivity Range (nm) | Projection Light Range (nm) |
| --- | --- | --- |
| ZnO | 300–390 | > 400 |
| CdSe | 400–730 | > 730 |
| Si | 400–1220 | > 1220 |
| Ge | 400–1970 | 1970 |

Thus, sensitivity for addressing this liquid crystal-photoconductor device is possible throughout the visible and into the infrared. The projection light range is at wavelengths greater than the sensitivity range and thus, in several cases the use of coherent infrared light would be necessary for the optical data processing. Other photoconductors having suitable characteristics could alternatively be used.

The nematic liquid crystal film is ordinarily transparent. However, when a current is passed through it, it becomes translucent and strongly scatters light. This behavior occurs because the nematic liquid crystal molecules are optically anistropic and, in the undisturbed state, they cooperatively align and behave optically like a uniaxial crystal film. However, when a current is passed through the film, the uniform structure is disrupted, causing rapid spatial changes in the optical index and, as a consequence, light scattering.

As described above, the current is controlled by the photoconductor and the addressing illumination thereof. The electric field is imposed by electric contacts 26 and 28, which are respectively connected to transparent electrically conductive layers 24 and 14, respectively. When the crystal is nematic, a DC field is applied to attain the scattering effect. DC source 30 is serially connected with switch 32 between the electrodes 26 and 28 to achieve the field application. Current density from 0.5 to 10 microamperes per square centimeter is required for strong scattering. This is achieved with application of 5 to 50 volts DC. The power consumption is in the order of 0.1 microwatts per square centimeter.

On the other hand, when a DC power supply in series with an AC supply is used to drive the liquid crystal cell, the background scattering of the liquid crystal in unactivated state is reduced. Furthermore, it decreases the decay time of the photoactivated electric crystal. Thus, as an alternative source of electric field, AC source 38 is serially connected with DC source 40 and through switch 42 to the two contacts 26 and 28. Thus, when switch 42 is closed, a DC field with an AC superimposed bias is applied. The cells require from 1 to 10 microamperes per square centimeter for activation and require an applied voltage from 5 to 50 volts DC with a superimposed AC bias of the same value as the DC, for example at 20 kilohertz. For a particular cell, the applied voltage was 40 volts DC plus 27 volts RMS at 20 kilohertz.

The same nematic liquid crystal cell 10 can be used to provide phase modulation as an input interface device for the optical processor.

The phase modulation capabilities of liquid crystal photoactivated light valves have also been used in this optical computer. The principle of operation is that, when light falls on the photoconductor film, its resistivity is changed and thus the voltage appearing across the liquid crystal in contact with it is changed. The index of refraction of the liquid crystal depends on the voltage across it. Thus, the index of the film is modulated by the light falling on the photoconductor. Coherent light passing through this film has its phase modulated by this index difference in the liquid crystal film. Thus, the film acts as a photoactivated phase modulating light valve and, as such, can be used as an optical processing input light valve. In this case, the liquid crystal cell 10 is operated with a lower applied voltage, such as 1–10 volts. This voltage is below that required to excite translucency or the dynamic scattering mode in the liquid crystal film. In this case, the liquid crystal film behaves like an electro-optic crystal with an extremely high electro-optic coefficient so that, with an applied voltage of a few volts, efficient phase modulation is possible. Again, the photoconductor 16 is used to spatially modulate the applied voltage by responding to the input incoherent light image focused onto it.

In another application, the liquid crystal cell 10 employs a nematic-cholesteric mixture. This mixture of liquid crystal media has the feature that it has the ability to store a light-scattered image impressed upon it. In the use of such a cell, an incoherent image is focused onto the photoconductive film of the liquid crystal layer and a DC voltage is briefly applied. This is accomplished by brief closure of the switch 32 connected in series with DC source 30. A translucent light-scattering reproduction of the addressed image will appear in the liquid crystal film and remain there, even after the DC voltage and incoherent image are removed. The cell is erased by briefly applying a high frequency across the cell. This is accomplished by AC source 34 connected in series with switch 36 across the contacts 26 and 28.

Figure 1:
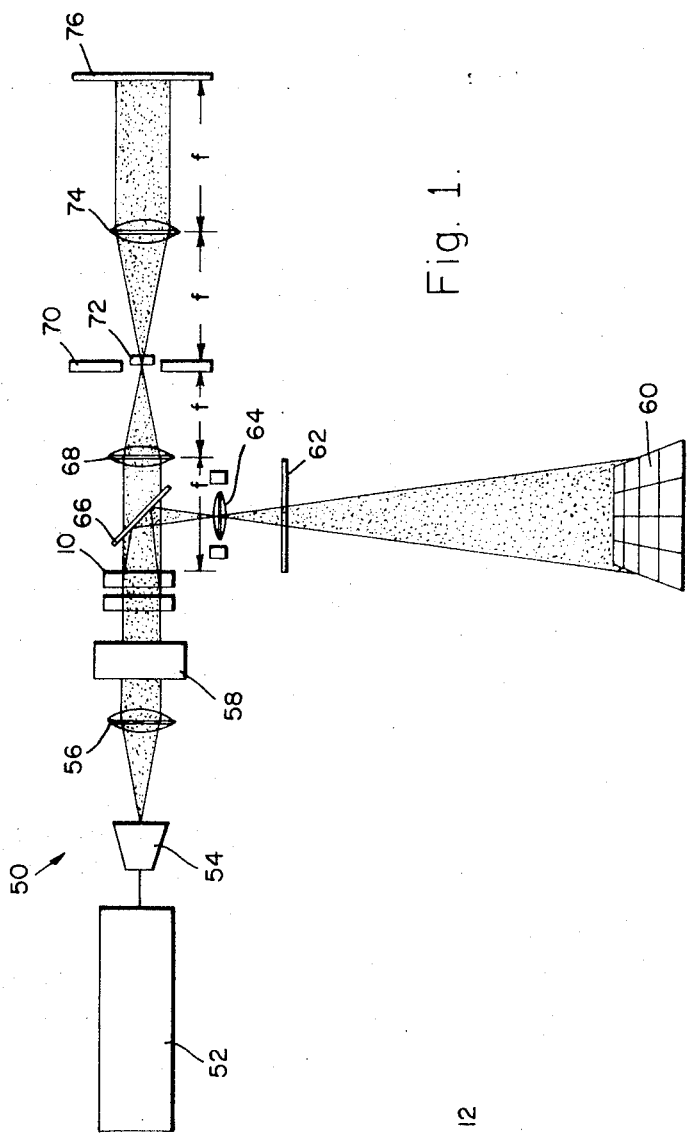
FIG. 1 is a schematic diagram of an optical processor incorporating a liquid crystal, in accordance with this invention.

Referring to FIG. 1, the preferred embodiment of the liquid crystal optical processor is generally indicated therein by the reference numeral 50. This processor employs a laser 52 as the source of coherent light. For example, a helium-neon laser having a wavelength of 632.8 nanometers and a power of 18 milliwatts is useful as a specific source. The light from the laser is passed through a spatial filter 54 and is recollimated by lens 56.

From the recollimator lens 56, the light from the laser is passed through mechanical chopper 58. This chopper is an optional device and comprises a rotating shutter structure having a 90 hertz chopping frequency. The chopper is employed to allow accurate measurement at the processor output without the need for DC level correction. Next along the optical axis of processor 50 is liquid crystal cell 10. As previously discussed, the liquid crystal cell 10 acts as a light valve which can be addressed so that portions thereof are transparent, while other portions scatter transmitted light.

Address or exposure of the liquid crystal cell 10 is accomplished by providing an image 60 which contains the information as to spatial control of transparency of liquid crystal 10, as is desired. The image 60 may be a back-illuminated transparency, or other image having sufficient illumination to control the liquid crystal cell 10. The image 60 is projected onto the cell 10 through shutter 62, lens 64, and beam splitter 66. In this way, the image 60 is projected onto the liquid crystal to control its light transmissivity, as previously described. The illumination of beam splitter 66 is ultraviolet. In the case of a zinc sulfide photoconductor 16 in the cell 10, peak sensitivity is below 400 nanometers and, with cadmium sulfide, peak sensitivity is below 520 nanometers. Thus, ultraviolet for ZnS or blue-green for CdS illumination at these wavelengths results in proper address of liquid crystal cell, while the laser beam at 632.8 nanometers does not affect the image on the electric crystal. In the case of a nematic liquid crystal, the address is maintained, as long as spatial transparency controller liquid crystal cell is desired. On the other hand, with the nematic-cholosteric mixture which has a memory, shutter 62 can be employed to address and impress upon the cell the desired image. The liquid crystal is thus a spatial filter.

The coherent laser light is directed along the optical axis of the system. Spatial Fourier transform is produced by first transform lens 68. It is placed one focal length down the optical axis from the liquid crystal layer in the liquid crystal cell 10. Since the liquid crystal causes scattering in the nontransparent areas, aperture plate 70 is placed one focal length downstream from first Fourier transform lens 68. The aperture plate obstructs the scattered rays, but permits the unscattered rays from the transparent areas of the liquid crystal cell to pass through at the focus.

Downstream from aperture plate 70 and, thus, slightly below the focal point of lens 68, is the Fourier processing plane, at which filter 72 is located. Filtration of the Fourier transform is accomplished at this plane.

As is fully explained in the book *Optical Data Processing*, supra, filtration at the Fourier processing plane can be employed for removal of unwanted signals. Three focal lengths along the axis from the liquid crystal cell 10, and one focal length beyond aperture plate 70 is located Fourier transform lens 74 which provides an inverse transform. The inverse transform is projected upon output plane 76. This plane may be a screen for visual observation, a photographic emulsion, another liquid crystal sensitive to that wavelength, one or more photodiodes to measure the light flux, or a vidicon T.V. pickup. These may be employed either in the output plane 76 or the transform image plane at processing plane 72. By this means, Fourier transform of the information provided by image 60 and controlled by Fourier processing at plane 72 is accomplished.

Figure 3:
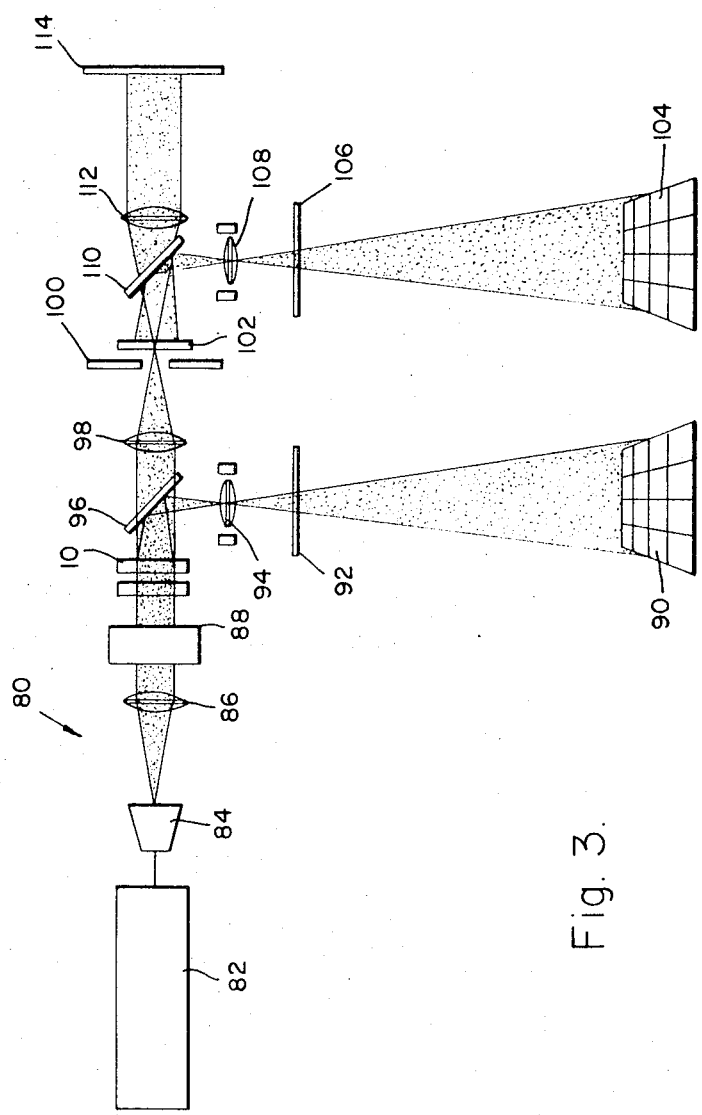
FIG. 3 is a further embodiment of a liquid crystal optical processor, in this case also employing a liquid crystal adjacent the Fourier transform plane as a Fourier processing filter.

Referring to FIG. 3, the liquid crystal optical processor 80 is very similar to the optical processor 50. Laser 82, spatial filter 84, lens 86, and chopper 88 are positioned along the optical axis of processor 80 and respectively correspond to the equivalent parts described with respect to processor 50. Similarly, processor 80 contains a liquid crystal cell 10 which is addressed by incoherently ultravioletly illuminated image 90 for ZnS photoconductor or blue-green for CdS photoconductor through shutter 92, lens 94, and beam splitter 96, similarly to the corresponding elements described with respect to optical processor 50.

First Fourier transform lens 98 is positioned one focal length downstream along the axis from the active part of the liquid crystal cell 10. Furthermore, aperture plate 100 is positioned another focal length downstream along the axis. The aperture plate 100 is at the focal point of the collimated light from first transform lens 98 and, directly adjacent thereto, is the Fourier processing plane. At the Fourier processing plane in optical processor 80 is positioned liquid crystal cell 102. Liquid crystal cell 102 is identical to cell 10 and is actuated in the same way.

As previously described, Fourier processing is accomplished at the processing plane by filtration. Optical filtration is accomplished by obstructing transmission of coherent light through certain areas, such as is accomplished by a transparency. Since the liquid crystal cell 102 can be controlled in the same way to provide nontransparent areas, Fourier processing at the processing plane can be accomplished by such a liquid crystal cell. The advantage of the cell is that rapid address is accomplished so that processing can be varied continuously. Of course, this is true also of the cells 10 with a time varying input thereto. Similarly to the cell 10, liquid crystal cell 102 has an input from image 104 which is incoherently illuminated, and its image is projected through shutter 106, lens 108, and beam splitter 110 onto the cell 102 to control the transparency of the cell.

The resultant processed image is retransformed by second Fourier transform lens 112 to appear at output plane 114. It will be recognized that the processor 80 is identical to the processor 50, but with the further addition of the liquid crystal cell as the Fourier transform processor. Thus, both the image input and the processor image can be rapidly changed and can include continuously variable inputs and outputs.

This invention having been described in its preferred embodiment, it is clear that it is susceptible to numerous modifications and embodiments within the ability of those skilled in the art.

What is claimed is:

1. An optical processor having an optical axis comprising:
   a source of collimated illumination for directing a collimated beam of light along said axis;
   an illumination chopper positioned on said axis for cyclically chopping illumination passing along said axis;
   a filter positioned on said axis beyond said chopper and extending at least partially transversely to said axis for controlling the transmission of lateral portions of the beam of light in a direction parallel to said axis to produce a laterally patterned light beam, said filter comprising a liquid crystal filter;
   second illumination means for illuminating an image and projection means for projecting said illuminated image onto said liquid crystal filter, said second illumination means being separate from said source of collimated illumination, so that said liquid filter can be addressed by said illuminated image to produce the laterally patterned light beam;
   a lens positioned along said axis downstream from said filter for effecting a transform of the image in the beam produced by the transmissivity configuration of said filter, the transform occurring at a transform plane adjacent the focal point of said lens.

2. The optical processor of claim 1 wherein said filter is sensitive to illumination by light having a wavelength in a second range, and said second illumination means illuminates said filter with said image with light having a wavelength in said second range, and said collimated source of illumination for directing light along said axis has a wavelength in a first range substantially outside of said second range.

3. The optical processor of claim 2 wherein said liquid crystal filter comprises first and second spaced filter cover plates, each carrying a substantially transparent electric conductive layer, a photoconductor between said filter plate and adjacent one of said cover plates, and a liquid crystal between said photoconductor and the other of said cover plates, so that application of voltage between said electrically conductive layers applies an electric field across said photoconductor and said liquid crystal.

4. The optical processor of claim 3 wherein said photoconductor in said liquid crystal filter has reduced resistivity when illuminated by light of wavelength in said second range so that a portion of the liquid crystal adjacent the illuminated photoconductor has a higher electric field applied thereto.

5. The optical processor of claim 4 wherein said liquid crystal is a nematic liquid crystal.

6. The optical processor of claim 5 wherein a direct current electric field with a superimposed alternating current electric field is applied across said electrically conductive layer.

7. The optical processor of claim 4 wherein said liquid crystal is a liquid crystal of mixed nematic and cholesteric liquid crystal materials.

8. The optical processor of claim 7 wherein a source of direct current electrical potential is applied to said electrically conductive layers.

9. The optical processor of claim 1 further including a spatial filter at said transform plane, a retransform lens downstream from said transform plane and means for observing the retransformed image along the axis downstream from said retransform lens, said spatial filter at said transform plane being a second liquid crystal filter.

10. The optical processor of claim 9 further including second illumination means for illuminating a second image and projection means for projecting said second illuminated image onto said spatial filter at said transform plane, separately from said laser source of illumination so that said second liquid filter can be addressed by said second illuminated image.

11. The optical processor of claim 10 wherein said second liquid crystal filter comprises first and second spaced filter cover plates, each carrying a substantially transparent electric conductive layer, a photoconductor between said cover plates and adjacent one of said cover plates, and a liquid crystal between said photoconductor and the other of said cover plates so that application of voltage between said electrically conductive layers applies an electric field across said photoconductor and said liquid crystal.

12. The optical processor of claim 11 wherein said photoconductor in said second liquid crystal filter has reduced resistivity when illuminated by light of wavelength to which it is sensitive so that a portion of the liquid crystal adjacent the illuminated photoconductor has a higher electric field applied thereto.

13. The optical processor of claim 12 wherein said liquid crystal in said second liquid crystal filter is a nematic liquid crystal.

14. The optical processor of claim 13 wherein a direct current electric field with a superimposed alternating current electric field is applied across said electrically conductive layer.

15. The optical processor of claim 11 wherein said liquid crystal in said second liquid crystal filter is a liquid crystal of mixed nematic and cholesteric liquid crystal materials.

16. The optical processor of claim 15 wherein a source of direct current electrical potential is applied to said electrically conductive layers.

* * * * *